United States Patent [19]

Joosten

[11] Patent Number: 5,676,594
[45] Date of Patent: Oct. 14, 1997

[54] APPARATUS FOR PROCESSING POULTRY SUSPENDED FROM THEIR LEGS

[75] Inventor: Egbertus Martinus Joosten, Oostzaan, Netherlands

[73] Assignee: Machinefabriek Meyn B.V., Oostzaan, Netherlands

[21] Appl. No.: 547,887

[22] Filed: Oct. 25, 1995

[30] Foreign Application Priority Data

Nov. 2, 1994 [NL] Netherlands ............... 9401820

[51] Int. Cl.$^6$ .................................................. A22C 21/00
[52] U.S. Cl. .................................... 452/188; 452/185
[58] Field of Search ........................... 452/185, 179, 452/187, 188, 180, 116

[56] References Cited

U.S. PATENT DOCUMENTS

| | | | |
|---|---|---|---|
| 925,993 | 6/1909 | Chapman | 452/188 |
| 2,817,874 | 12/1957 | Conaway | 452/188 |
| 3,152,360 | 10/1964 | Fox et al. | 452/188 |
| 3,166,785 | 1/1965 | Lemmond | 452/188 |
| 3,958,303 | 5/1976 | Scheier et al. | |
| 4,024,603 | 5/1977 | Harben, Jr. et al. | |
| 4,131,973 | 1/1979 | Verbakel | |
| 4,155,146 | 5/1979 | Meyn | |
| 4,183,118 | 1/1980 | Graham et al. | |
| 4,270,242 | 6/1981 | Loth et al. | 452/116 |
| 4,339,849 | 7/1982 | Van Mil | |
| 4,382,314 | 5/1983 | Graham | |
| 4,899,421 | 2/1990 | Van der Eerpen | 452/116 |

FOREIGN PATENT DOCUMENTS

| | | |
|---|---|---|
| 7300546 | 7/1973 | Netherlands |
| 7501521 | 2/1975 | Netherlands |
| 7700677 | 1/1977 | Netherlands |
| 7801712 | 2/1978 | Netherlands |
| 8104877 | 10/1981 | Netherlands |

*Primary Examiner*—Willis Little
*Attorney, Agent, or Firm*—Dority & Manning

[57] ABSTRACT

The invention relates to an apparatus for processing poultry suspended from their legs and includes a processing device and a positioning brace provided for engagement between the legs of the poultry. A plate section is mounted onto the positioning brace which will engage the tail of the poultry and which is pivotable relative to the positioning brace around a horizontal pivot axis.

5 Claims, 3 Drawing Sheets

APPARATUS FOR PROCESSING POULTRY SUSPENDED FROM THEIR LEGS

BACKGROUND OF THE INVENTION

The present invention relates to an apparatus for processing poultry suspended from their legs, especially ducks, comprising a processing means movable upwards and downwards along a guiding and a generally U-shaped positioning brace provided for engagement between the legs of the poultry.

Known devices of this type are applied for carrying out a number of operations. One may mention the evisceration of poultry according to which an eviscerating means is moved into the abdominal cavity of the poultry through an opening between the legs of the poultry, or one may mention the removal of the lungs from the poultry, in respect of which a suction means is pushed into the abdominal cavity, or the removal of the craw, wherein a processing means is applied which is moved through the abdominal cavity and traverses the neck of the poultry. With each of these known devices, it is essential that a proper positioning of the poultry to be processed occurs relative to the device. Thus, these devices comprise a positioning brace engaging between the legs of the poultry onto the lower body section.

When used for processing chickens, these known devices operate properly. However, these devices show disadvantages when used for processing ducks. This is caused by the fact that ducks, compared with chickens, have a rather large tail which, moreover, is rather flexible. Whereas the small, little and movable, tail of chickens hardly causes problems. The larger, flexible tail of ducks forms an obstruction to the processing means. In practice, it appears that the tail often fully or partially covers the opening providing entrance to the abdominal cavity of the duck, such that the processing means either cannot enter the abdominal cavity or damages the tail while entering the abdominal cavity. In the first case, the desired processing of the duck does not occur, whereas in the second case an end product is obtained which is damaged and thus is commercially less attractive.

U.S. Pat. No. 4,183,118 shows an apparatus wherein a substantially vertically extending plate section is mounted onto a positioning plate, said plate section being provided for engagement with the tails of poultry.

While positioning the positioning plate between the legs of the poultry, the plate section mounted onto the positioning plate will engage the tail of the poultry and move it.

With this known apparatus, the plate section has a fixed position relative to the positioning plate. Such an embodiment is less complicated, cheap, demands little service, and is especially fit for application in an apparatus of which the processing means is moved substantially rectilinearly into the poultry to be processed, for example in an apparatus for removing the craw.

OBJECTS AND SUMMARY OF THE INVENTION

A principal object of the present invention is to provide an improved apparatus and device for processing poultry, particularly ducks, suspended from their legs in a processing line. Additional objects and advantages of the invention will be set forth in part in the following description, or may be obvious from the description, or may be learned through practice of the invention.

In accordance with the present invention, however, the plate section is pivotable relative to the positioning brace and around the horizontal pivot axis extending transversally to the positioning brace. As a result, the apparatus is extremely fit for application in an apparatus wherein the processing means follows a non-rectilinear motion, such as when eviscerating poultry. Then the eviscerating means firstly is positioned closely to the back side in the abdominal cavity, is next moved internally towards the belly side and stuck deeper into the abdominal cavity, and finally is moved outwards along the chest side. Initially, the pivotable plate section rests against the tail of the bird to be processed and thus has an inclined position in which the free end of the plate section partially enters the body opening. In this position, the arriving processing means will engage the plate section such that it is lifted to a more vertical position and then pushes aside the tail. Further, during this phase, the plate section will carry out a guiding function for the processing means, because a pivoting of the plate section will automatically lead to the correct positioning of the respective body opening relative to the arriving processing means. Therefore, in the apparatus according to the invention, the plate section carries out a double function, namely moving the tail of the poultry away from the track of the processing means and correctly positioning the processing means relative to the body cavity.

Because the plate section is pivotable, it is possible to provide control means co-operating with the plate section, such as sensors, switches and the like. These sensors, switches and the like will react on a pivoting of the plate section and thus can activate defined parts of the apparatus, for example the processing means itself (conceivable is an activation of a vacuum source in an apparatus for sucking the lungs out of the abdominal cavity, or initiating the movement of a part of an eviscerating means). In such a case, the pivoting of the plate section indicates the moment at which the processing means enters or has entered, respectively, the bird to be processed.

Of course the shape of the plate section may be varied accordingly. One may mention embodiments according to which the plate section is essentially planar or according to which the plate section gutter-shaped. In the latter case, the gutter is meant for reliably housing the tail such that it cannot slide sideways relative to the plate section.

Hereinafter the invention will be elucidated further referring to the drawing in which:

DETAILED DESCRIPTION OF THE PREFERRED EMBODIMENTS

Figure 1A:
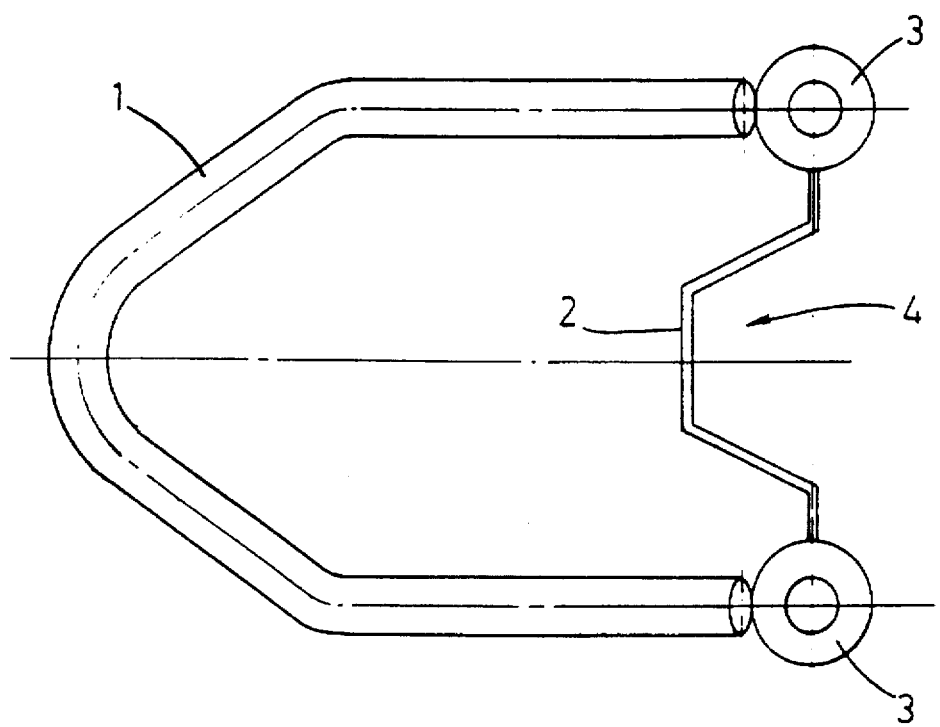
FIGS. 1A, 1B show partially an apparatus according to the state of the art, in a top plan view and a side elevational view, respectively.

Reference will now be made to the presently preferred embodiments of the invention, one or more examples of which are illustrated in the drawings. Each example is provided by way of explanation of the invention, and not as a limitation of the invention. In fact, various modifications and variations can be made in the invention without departing from the scope and spirit of the invention. The numbering of components is consistent throughout the application, with the same components having the same number in the drawings and description.

Figure 1B:
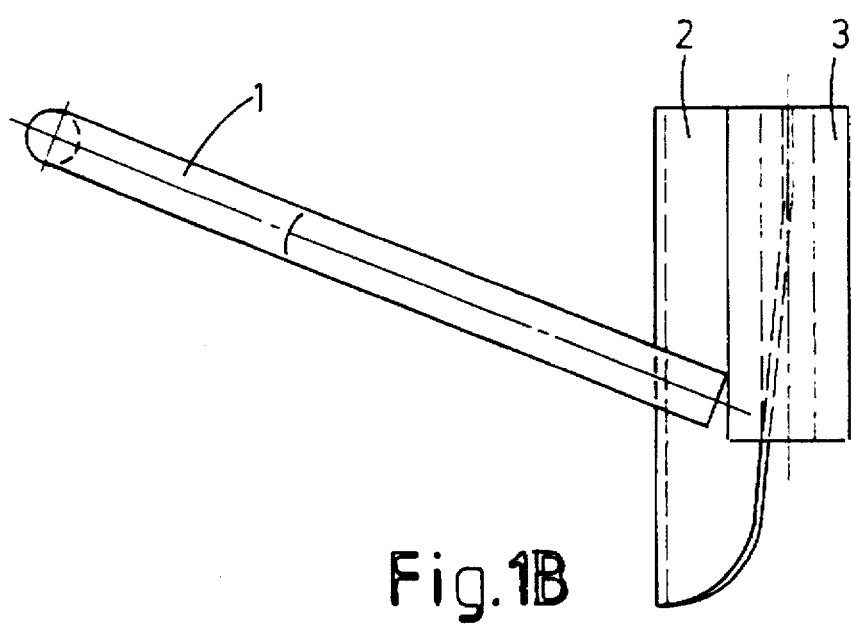

In FIGS. 1A and 1B there is represented only part of a U-shaped positioning brace 1 of a known apparatus, with a plate section 2 connected thereto. In fact, in this embodiment both the positioning brace 1 and plate section 2 are attached to two guiding blocks 3 which may move upwards and downwards along a guiding not illustrated. Such an upward and downward motion of the positioning brace 1 is known from the state of the art and thus is not to be explained further.

As seen in FIG. 1A, a bird to be processed assumes such a position that the positioning brace 1 extends between both legs of the bird, wherein the breast of the bird is positioned at the right side (the side of the plate section 2). When the positioning brace 1, together with the plate section 2, is moved downwardly along the guiding (not shown) the plate section 2 will engage the tail of the bird, said tail reaching the gutter-shaped recess 4 and being kept in place thereby. Next a processing means not shown further can be positioned simply in the abdominal cavity through the body opening between the legs of the bird.

The known embodiment according to FIGS. 1A and 1B is characterized by the fact that the plate section 2 has a fixed position relative to the positioning brace 1. This embodiment is especially appropriate for application in an apparatus for removing the craw of a bird.

The apparatus according to the state of the art illustrated in FIGS. 2A, 2B and 2C again comprises a positioning brace 5 of which, in this case, both legs are attached to two arms 6, 7 which, for a reason not important here, in a limited way are pivotable around a pivot axis 8. Again a plate section 9 is attached to the positioning brace 5 having a slightly bended end 10.

Again the arms 6 and 7, together with positioning brace 5 and plate section 9 connected thereto, are movable upwards and downwards along a guiding not illustrated, wherein during the downward motion the plate section 9 will engage the tail of a bird to be processed. As a result said tail will effectively be moved aside from the track of the processing means (not shown).

Figures 2A, 2B, 2C:
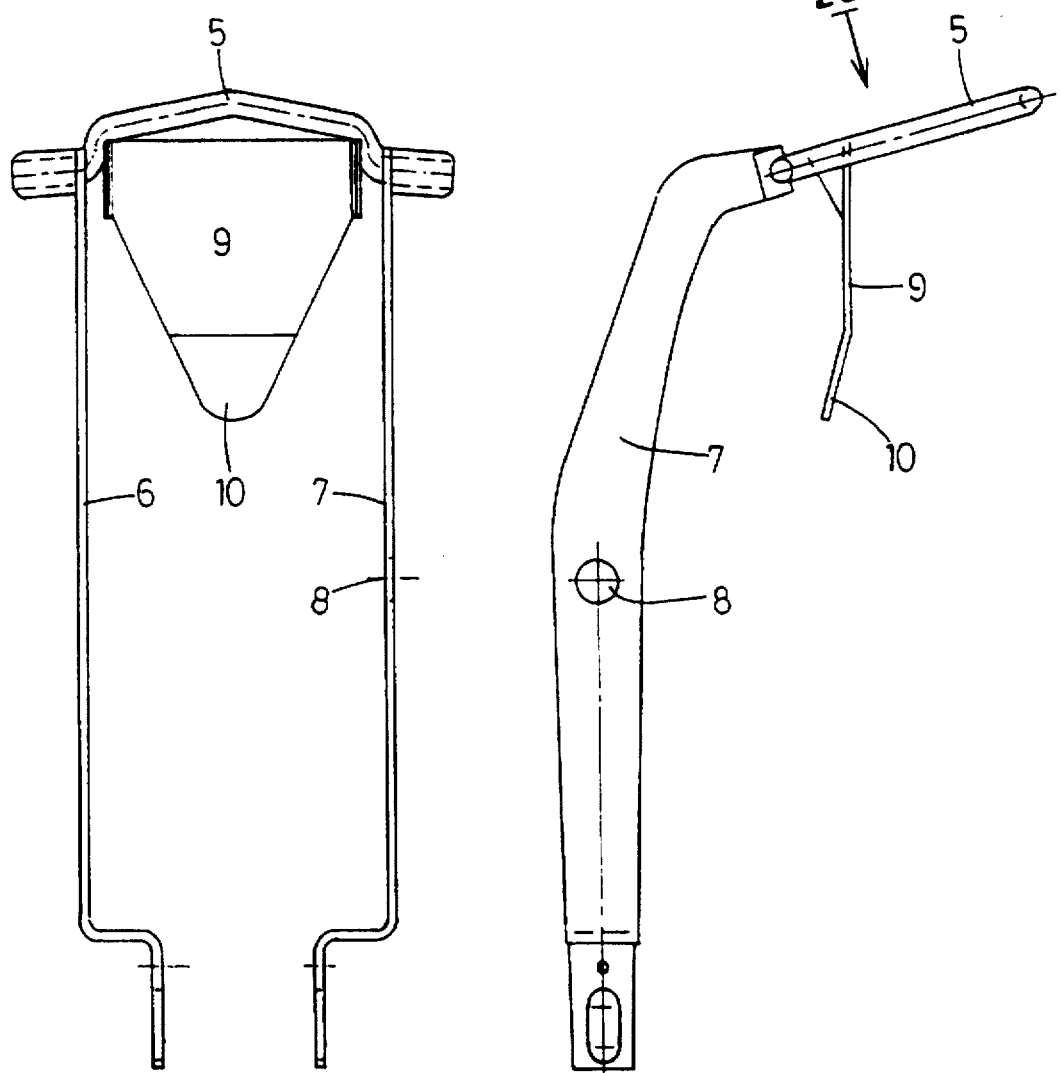
FIGS. 2A, 2B, 2C show partially a second apparatus according to the state of the art, in a top plan view, side elevational view and according to arrow 2C in FIG. 2B, respectively.

The known embodiment of the apparatus illustrated in FIGS. 2A, 2B and 2C is especially appropriate for application in an apparatus meant for sucking the lungs out of the chest cavity of a bird.

Figure 3A:
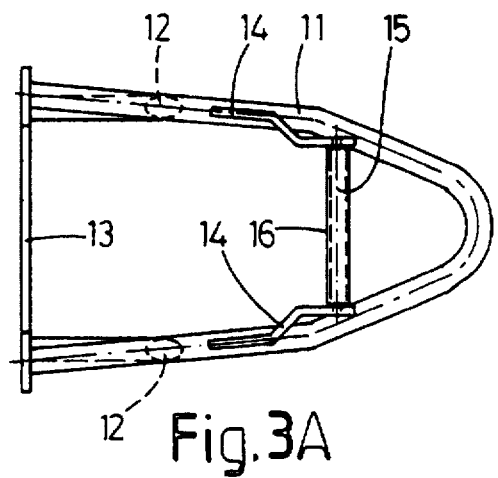
FIGS. 3A, 3B 3C show partially an embodiment of an apparatus according to the invention, in a top plan view, side elevational view and frontal view, respectively.
Figure 3B:
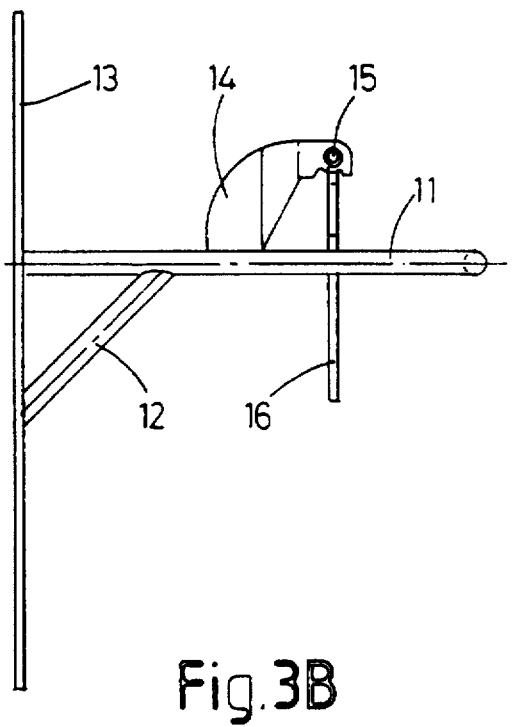
Figure 3C:
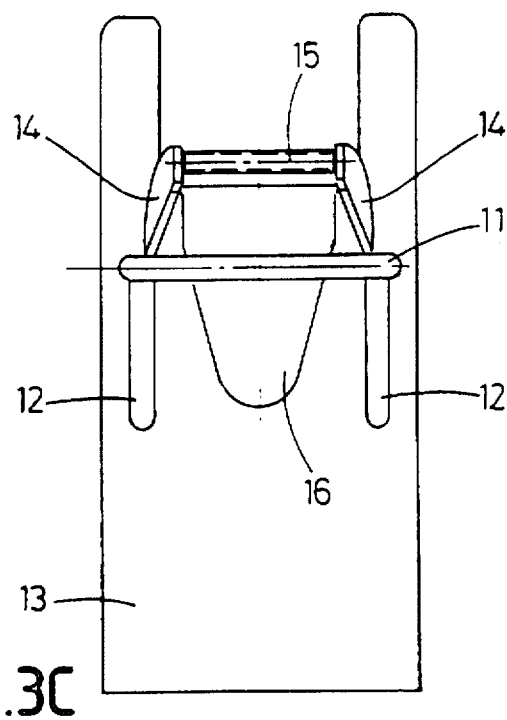

Finally FIGS. 3A, 3B and 3C illustrate an embodiment of the apparatus according to the invention. In contrast with the two embodiments illustrated in FIGS. 1 and 2, this embodiment is characterized by a plate section which is pivotable relative to the positioning brace. Now in detail, a positioning brace 11 is provided which by means of supports 12 is attached to a mounting plate 13. Again this mounting plate 13 can, in a way not shown further, be movable upwards and downwards along guidings. Two braces 14 are mounted onto the U-shaped positioning brace 11, said braces at the ends thereof being connected by a horizontal pivot axis 15. A plate section 16 is suspended from this pivot axis and thus can pivot relative to positioning brace 11 around the horizontally extending pivot axis 15.

When the mounting plate 13 with positioning brace 11 is moved downwards the plate section 16 will engage the tail of the bird and thus in a limited way will pivot towards its inclined position. The direction into which the plate section will pivot depends upon the positioning of the bird relative to the positioning brace 11, that is whether the spine, as seen in FIG. 3B, is at the left hand side or at the right hand side. Next, when the processing means is moved towards the abdominal cavity of the bird it will engage this inclined plate section 16 and will pivot it back towards the vertical position illustrated in FIG. 3B. Like this, the plate section 16 not only functions as means for pushing the tail of a bird to be processed out of the way of the processing means, but the plate section 16 also takes care of a correct guiding of the processing means into the abdominal cavity of the bird (wherein generally not the movement of the processing means but the position of the body cavity of the respective bird will be adjusted.)

The embodiment according to the invention is especially appropriate with apparatus of which the processing means follow a non-rectilinear motion, such as an eviscerating means for eviscerating the entrails. It should be emphasized however that in this embodiment the plate section also may comprise a gutter-shape, such as the plate section 9 in the embodiment according to FIGS. 2A, B and C.

Not illustrated in FIGS. 3A, B and C are switches, sensors or the like which might be provided and might cooperate with the plate section 16 in such a way that a pivoting of the plate section 16 activates these switches, sensors or the like which, at their turn take care of activating a certain part of the respective apparatus, for example the processing means. Like this, the plate section 16 also has an indicator function.

The invention is not limited to the embodiment described before which may be varied widely within the scope of the invention as defined by the claims. Those skilled in the art will recognize that various modifications and variations can be made in the invention without departing from the scope and spirit of the invention. It is intended that the present invention cover such modifications and variations as come within the scope of the appended claims and their equivalents.

I claim:

1. An apparatus for processing poultry suspended from their legs in a suspension conveyor in a continuous processing line, comprising a processing device movable upwards and downwards with respect to the suspended poultry, a generally horizontally extending positioning brace configured for engagement between the legs of the poultry upon movement of said processing device, and a substantially vertically extending plate section pivotally mounted to said positioning brace, said plate section configured for engagement with the tails of the poultry for moving the tails out of contact with said processing device, said plate section pivotable relative to a horizontal axis extending transversely to the positioning brace.

2. The apparatus as in claim 1, wherein said positioning brace comprises a substantially U-shaped member.

3. The apparatus as in claim 1, wherein said plate section is a substantially planar member and is supported for pivotable movement by braces extending from said positioning brace.

4. The apparatus as in claim 1, wherein said plate section is substantially gutter shaped.

5. The apparatus as in claim 1, further comprising control means, including a sensor, cooperating with said plate section wherein movement of said plate section is detected and initiates a processing function of said processing device.

* * * * *